United States Patent [19]

Mercier et al.

[11] 3,940,546

[45] Feb. 24, 1976

[54] CHLORINATED SILICEOUS MATERIALS AS FILLERS AND REACTANTS

[75] Inventors: Jean Mercier, Kessel-Lo; Marc Della Faille, La Neuve Cour; Claude Bleiman, Kessel-Lo, all of Belgium

[73] Assignee: Gerdec, Paris, France

[22] Filed: Mar. 11, 1974

[21] Appl. No.: 449,683

Related U.S. Application Data

[62] Division of Ser. No. 270,625, July 11, 1972, Pat. No. 3,839,062.

[30] Foreign Application Priority Data

July 13, 1971  France............................. 71.25714

[52] U.S. Cl. ................. 428/446; 427/399; 428/538
[51] Int. Cl.² ........................ B05D 5/00; B32B 9/04
[58] Field of Search... 117/54, 118, 123 C, 126 AQ; 106/288 B; 260/42.14, 46.5 R; 427/399; 428/446, 538

[56] References Cited

UNITED STATES PATENTS

| | | | |
|---|---|---|---|
| 3,184,288 | 5/1965 | de Liole................................ | 162/3 |
| 3,297,516 | 1/1967 | Naumann et al. ...................... | 162/3 |
| 3,458,393 | 7/1969 | Battista.................................. | 162/3 |
| 3,689,430 | 9/1972 | Yates.................................... | 117/126 |
| 3,692,816 | 9/1972 | Faille et al. ......................... | 260/46.5 |

*Primary Examiner*—Harry J. Gwinnell
*Assistant Examiner*—Sadie L. Childs, Sr.
*Attorney, Agent, or Firm*—Millen, Raptes & White

[57]  ABSTRACT

A material having a siliceous framework of a phyllosilicate in which 5—80% by weight of the octahedral layers are removed and chlorine atoms are linked to the framework through Si—Cl bonds are used as fillers in the preparation of polymers or are reacted with organic compounds by substituting the Cl, these organic compounds having a polymerizable portion in the molecule.

15 Claims, No Drawings

CHLORINATED SILICEOUS MATERIALS AS FILLERS AND REACTANTS

This is a division of application Ser. No. 270,625 filed July 11, 1972, now U.S. Pat. No. 3,839,062, issued Oct. 1, 1974.

BACKGROUND OF THE INVENTION

The invention relates to a process for preparing a siliceous inorganic material especially in the form of fibers particularly suitable for obtaining organomineral copolymers, and more particularly to be used as a filler for strengthening polymers and elastomers. It concerns also siliceous materials as obtained in this process and their applications for the achievement of organomineral composites, chiefly as strengthening fillers for polymers or elastomers.

The main object of the invention is to make possible the grafting of organic radicals on a mineral siliceous framework, and more particularly on the two-dimensional siliceous framework of the phyllosilicates.

This last word refers to minerals having in their structure at least a tetraedral layer of silica and oxygen and at least an octaedral layer that can be eliminated by acid hdyrolysis and containing particularly magnesium, aluminum and/or iron. Within the scope of the invention, these minerals are preferably fibrous, such as chrysotile or optionnaly sepiolite, or lamellar as mica, hydromica and vermiculite. All these minerals are cited as particularly common but these examples are not intended to be restrictive.

In fact, the use of phyllosilicates or products derived from phyllosilicates as strengthening fillers in polymers or elastomers is already well known. The grafting of polymerizable organic radicals on phyllosilicates by means of silanes has been already proposed.

With regard to such known processes, the invention aims at making the preparation of such products easier and at decreasing their cost price, in particular by avoiding the use of silanes.

SUMMARY OF THE INVENTION

The purpose of the invention is to obtain chlorinated phyllosilicates in which the atoms of chlorine are directly fixed upon the mineral framework and then can be substitued by organic radicals.

More precisely, the invention relates to a process for preparing a siliceous material, particularly useful for obtaining organomineral composites, which is characterized in that it comprises, as a first step, the acid hydrolysis of mineral of the phyllosilicate type and, as a second step, the chlorination of the hydrolyzed mineral. This chlorination is particularly effected with thionyl chloride or with phosgene, and preferably under the following conditions:

the hydrolysis step is carried out by reacting the mineral with a solution of a strong mineral acid at a concentration of 1 volume per 1 to 20 volumes of solvent and preferably of 1 volume per 1 to 10 volumes of solvent;

the concentration of mineral in the solution of hydrolysis is comprised between 10 and 75 g/l, and preferably between 35 and 55 g/l;

the chlorination step is effected by reacting the hydrolyzed mineral with thionyl chloride at a concentration of 1 volume per 0 to 50 volumes of solvent, and preferably of 1 volume per 1 to 20 volumes of solvent, the concentration of the hydrolyzed mineral being comprised between 10 and 75 g/l, and preferably between 25 and 40 g/l.

The siliceous material according to the invention, and particularly the material obtained by the above-mentioned process has a siliceous mineral framework and reactive atoms of chlorine which are linked to the said framework through Si—Cl bonds. Preferably the mineral framework is that of a phyllosilicate and the proportion of the octahedral layer removed and partly substituted by the atoms of chlorine is advantageously comprised between 5 and 80% by weight, and preferably between 10 and 40% by weight.

According to a special embodiment, the process of the invention comprises a third grafting step of organic radicals. It consists of a reaction of the chlorinated mineral with at least one organic compound having at least an organic group making a later polymerization possible and having, on the other hand, a reactive function that enables its grafting on the mineral framework by reaction on the atoms of chlorine. Such a reactive function can be particularly brought about by a hydroxyl group, a halogen, a metallic atom, for instance in an organo-metallic compound.

A siliceous material comprising organic radicals grafted upon the siliceous framework in the place of part or all the atoms of chlorine is obtained. Preferably, these radicals comprise at least one olefinic double bond in order to enable the polymerization.

According to a preferred embodiment of the process, the grafting of the organic radicals on the mineral framework is achieved through the mechanism of chain transfer by reacting the chlorinated mineral with at least one polymerizable monomer in the presence of initiators of free radicals and more particularly in the presence of organic peroxides.

The siliceous materials as obtained by the process of the invention in a chlorinated and/or grafted form, are most suitable for the obtention of organomineral composites and more particularly, they are advantageously used as strengthening fillers for polymers or elastomers.

For carrying out the invention, phyllosilicates in a fibrous form which can be magnesium or magnesium-ferric minerals in which the tetraedral layers of silica alternate with magnesium or magnesium magnesio-ferric layers such as chrysotile, are advantageously used. The invention however is not confined to the fibrous form; minerals with a similar bi-dimensional structure, but in a lamellar form, as for instance micas, hydromicas and vermiculite can be used also, the tetraedral layers of silica and the octaedral layers being in this case plane instead of wound.

The treatment of such minerals by the process according to the invention, in the course of both hydrolysis and chlorination steps may be explained as follows:

1. — a varying proportion of the octaedral layer (magensium more particularly) is removed by the acid treatment, 2. — the accessibility of silanolic sites to chlorination reagent is ensured by achieving an "opening" of the mineral either by defibering or defiolating, 3. — a chemical linkage of the chlorine atoms upon the so-liberated tetraedral layers of silicas having an acid character takes place.

The process according to the invention is easy to carry out, and besides it enables a large substitution of the octaedral layers (magnesium more particularly) by atoms of chlorine to be obtained on the whole. Depending on the properties which are looked after for the product, the rate of substitution can vary within very large limits, in general from about 1% to 50% whereas without any intermediary hydrolysis, this rate would be limited to values inferior to 2%. Nevertheless, the outside morphology of the treated phyllosilicate is preserved, for the reactions of hydrolysis and chlorination keep the integrity of the basic siliceous framework. A considerable increase of the specific surface compared with the basic mineral is observed. In the case of chrysotile for instance it can exceed 25 square meters per gram (m2/g).

The materials according to the invention show specific properties that make them very useful, more particularly as strengthening agents in the polymerizable products.

In a preferred embodiment of the process, the materials according to the invention seem to comply with the following formula:

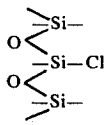

The atom of chlorine fixed upon the starting mineral material represents the reactive grafting site of the polymer, either through the direct grafting of a growing polymeric chain during the reaction of polymerization of a monomer or the reticulation of a polymer, according to the chain transfer mechanism, or through a coupling agent having the formula: R—X where X is an organic radical with 2 to 12 atoms of carbon and a reactive group able to be subjected to a reaction of polymerization, copolymerization or polycondensation with the polymeric matrix to be strengthened, and where X represents a group or an atom able to react chemically with the chlorine atom grafted upon the mineral. According to a preferred embodiment of the process of the invention, the X group will be a hydroxyl group or the inorganic part of an organo-metallic compound, organo-magnesian or organo-lithium compound for instance, this enumeration being not limitative in any way. More particularly the R—X compound is an unsaturated alcohol.

The complete formula of the material closely depends upon the conditions of preparation. Thus, the preliminary hydrolyzed reaction is achieved in the presence of a mineral acid, such as hydrochloric acid, sulphuric acid, nitric acid or an organic acid as acetic acid with a concentration and a temperature suitable for the desired reaction kinetics. These acids are dissolved into a solent generally constituted by water, preferably admixed with a saturated alcohol such as methanol, ethanol or isopropanol or a saturated ketone such as acetone or methylethylketone.

In general the reaction is effected at high temperature, this temperature remaining compatible with the boiling point of the alcohol or ketone used together with the acid. A similar hydrolysis reaction was described in patent Ser. No. 84120 filed Oct. 26, 1970 by M. della FAILLE and al., and now U.S. Pat. No. 3,692,816, and the conditions of reaction described in this application for a patent are advantageously used in the working out of the process according to the invention.

The chlorination reaction is achieved in the presence of a strong chlorination agent as thionyl chloride for instance, either pure or diluted into a "bearing" solvent. This solvent preferably belongs to the class of aromatic solvents as benzene toluene of xylene for instance, or to the class of saturated aliphatic solvents as heptane, octane, etc. According to a preferred eembodiment of the process of the invention, the temperature is close to the boiling point of the used chlorination reagent. A preferred solvent is heptane. Chlorination by means of solutions of thionyl chloride in toluene or heptane, and at a temperature close to the boiling point of thionyl chloride, that is to say around 79°–82°C has proved to be particularly advantageous. An advantageous process uses pure thionyl chloride at this very temperature. The treatment time is preferably comprised between 1 and 10 hours, and more preferably is about 4 hours. Besides, the best chlorination yields are obtained when the previous hydrolysis is carried out in a solvent at least partly made of an alcohol or a ketone and more particularly in isopropanol or methylethylketone. The chlorinated mineral finally obtained can be submitted to a drying treatment under vacuum in order to desorb the reagents (thionyl chloride and toluene more particularly) that may remain.

Organomineral sequenced polymers can be obtained as well through polymerization of monomers derived from mono or diolefins on the material obtained in compliance with the present invention. Likewise such polymers can be produced through polycondensation on the said material. They can also be produced by said polymerization or polycondensation in the presence of the coupling agent as described above.

DESCRIPTION OF PREFERRED EMBODIMENTS

The following examples are given to illustrate the present invention in a non restrictive way.

EXAMPLE 1

In a 2000 ml reactor, provided with an agitator and a reflux cooler, 80 g of chrysotile fiber, 1000 ml of concentrated hdyrochloric acid and 1000 ml isopropanol were introduced. After heating at 50°c during 52 hours, the fiber hydrolyzed by centrifugation was washed with methanol until no trace of acidity remains. 94% of the magnesium octaedral layer were removed and the hydrolyzed fiber thus obtained showed a specific surface of 480 m2/g. After drying, 10 g of this hydrolyzed fiber were introduced into the Kumagawa reactor and treated with the thionyl chloride at its boiling temperature for 4 hours. After drying a chlorinated fiber containing 12% by weight of elementary chlorine was thus obtained. This chlorinated fiber can be directly incorporated into a mixture during polymerization in order to obtain an organomineral copolymer.

EXAMPLE 2

25 ml of monomer styrene and 75 ml of benzene were distilled under vacuum in a reaction vessel containing 10 g of the chlorinated fiber produced according to Example 1 and 1.25 g of benzoyl peroxide. After removing the gas, the vessel was sealed and put into a thermostatically controlled polymerization vessel at 45°c during 24 hours, then at 60°c for 96 hours.

Then the grafted fiber thus synthesized was extracted with benzene during 24 hours, so as to remove the formed exclusively organic homopolymer, then dried. The so-treated fiber contained 29.5% of elementary carbon by weight. The average molecular weight of the styrene polymer grafted upon the mineral fiber amounted to 11,500 approximately. The so-obtained organomineral product is a strengthening filler for the manufacture of polymer of elastomer composites.

EXAMPLE 3

10 g of chlorinated fiber as obtained according to Example 1, 100 ml pyridine and 200 ml allyl alcohol were introduced into a 500 ml reactor provided with an agitator and a reflux cooler. The reaction was carried on during 4 hours at the refluxing temperature of alcohol. The grafted fiber thus obtained was washed with dry methanol, extracted then with ether during 24 hours and dried. Through this process, 13% by weight of elementary carbon was grafted onto the fiber.

The same reaction was carried out by replacing the chlorinated fiber by 10 g of hydrolyzed fiber as in Example 1 and a grafted fiber containing 7.3% of carbon by weight was finally obtained. The grafting yield of allyl alcohol then is notably superior in the case of the chlorinated fiber and therefore the strengthening quality is increased.

EXAMPLE 4

80 g of chysotile fiber, 1000 ml of concentrated hydrochloric acid and 1000 ml of isopropanol were introduced into a 2000 ml reactor, provided with an agitator and a reflux cooler. After heating at 40°c for 7 hours and neutralizing the hydrolysis solution with NaOH, the hydrolyzed fiber was treated as in Example 1. Forty percent of the magnesium octaedral layer were then removed and the so-achieved hydrolyzed fiber showed a specific surface of 125 m$^2$/g. After drying, 10 g of this fiber were introduced into a Kumagawa apparatus and treated with thionyl chloride at its boiling temperature for 4 hours. After drying, then a chlorinated fiber containing 20.4% by weight of elementary chlorine was obtained.

EXAMPLE 5

15% of octaedral layer of a non-expanded vermiculite were removed by a hydrolysis process similar to that described in Example 1. Five grams of this hydrolyzed vermiculite were placed into a Kumagawa apparatus and treated with thionyl chloride at its boiling temperature for 4 hours. After drying, a chlorinated vermiculite containing 5.4% by weight of elementary chlorine was obtained. The obtained chlorinated vermiculite can be directly incorporated into a polymerization mixture in order to produce an organomineral copolymer.

EXAMPLE 6

80 g of chrysotile fiber, 800 ml of concentrated hydrochloric acid and 800 ml of water were placed into a 2000 ml reactor provided with an agitator and a reflux cooler. The reaction was carried out at 25°c for 4 hours. The hydrolyzed fiber was recovered by centrifugation and then washed with water until all traces of acid disappeared. Twenty percent of the magnesium octaedral layer were removed and the so-obtained hydrolyzed fiber showed a specific surface of 60 m$^2$/g. After drying, 10 g of this hydrolyzed fiber were introduced into a Kumagawa reactor and treated with thionyl chloride at its boiling temperature for 4 hours. After drying, a chlorinated fiber containing 7.6% by weight of elementary chlorine was obtained.

EXAMPLE 7

Chrysotile fiber was hydrolyzed by treating a mixture of concentrated hydrochloric acid and isoporpanol at equal volumes at 40°c for 20 mn.

The hydrolyzed fiber was then treated with thionyl chloride in benzene for 4 hours under reflux. The rate of chlorine of the so-treated fiber amounted to 1.28% by weight.

EXAMPLE 8

6 g of the same hydrolyzed fiber as in Example 7 were used in 100 g benzene. Phosgene was bubbled into the mixture during 3 hours, at room temperature. A chlorinated fiber with a chlorine rate of 3.05% by weight was obtained.

EXAMPLE 9

The chlorination treatment was applied to the same hydrolyzed fiber obtained in Example 7, but the reaction was effected in a column, without any solvent, by passing a gaseous $COCl_2$ current at room temperature for 3 hours.

A chlorine rate of 1.84% by weight was obtained.

EXAMPLE 10

Chrysotile fibers, hydrolyzed as described in Example 6 in order to remove 20% by weight of the octahedral layer (magnesium), were submitted to a chlorination treatment by a solution of thionyl chloride in toluene. For this purpose, 10 g of hydrolyzed chrysotile fibers, 270 ml of toluene and 30 ml of distilled thionyl chloride were introduced into a flask fitted with a reflux cooler. The whole was heated and refluxed during 4 hours, then a classical distillation apparatus was substituted for the reflux cooler and the excess of thionyl chloride was distilled until pure toluene was obtained. The reaction mixture was left to cool and put into a glass tube having a porous bottom, in the absence of air and moisture, for 12 hours in order to remove most toluene by draining the fiber. Finally the chlorinated fiber was dried under vacuum ($10^{-2}$ torr) for 48 hours at a room temperature, then for 24 hours at 60°c and kept under $P_2O_5$ in order to avoid the action of moisture.

Thus, a chlorine rate (percentage of elementary chlorine fixed upon the mineral by weight) of 2.9% was obtained.

The following results were obtained by varying toluene and $SOCl_2$ proportions:

for 150 ml of toluene and 150 ml of $SOCl_2$, chlorine rate: 3.0%.

for 200 ml of toluene and 100 ml of $SOCl_2$, chlorine rate: 2.9%.

for 285 ml of toluene and 15 ml of $SOCl_2$, chlorine rate: 2.5%.

a chlorine rate of 2.9% was obtained by using 300 ml of pure $SOCl_2$ for 10 g of hydrolyzed mineral.

By varying the time of treatment of a mixture of 270 ml toluene and 30 ml $SOCl_2$, chlorine rates of 2.5% for 2 hours and of 3.3% for 8 hours were obtained.

EXAMPLE 11

Asbestos fibers of the chrysotile type, hydrolyzed under various conditions, were submitted to a chlorination treatment with a solution of thionyl chloride at 10% by volume in toluene. The reaction was carried on for 4 hours under reflux, that is to say at a temperature of about 79° to 82°C. The chlorinated mineral was dried under vacuum of $10^{-2}$ torr for 48 hours.

For an hydrolysis rate of about 10%, 20%, 40%, 80%; (percentage by weight of removed octahedral layer), the respective chlorine rates of the chlorinated mineral (percentage of fixed chlorine, by weight) were:

2.1%, 2.6%, 7.8%, 12.2%; when the hydrolysis was carried out with hydrochloric acid diluted with water to 6N;

2.1%; 3.4%; 8.2%; 13.7% when the hydrolysis was carried out with hydrochloric acid 12N diluted by adding an equal volume of isopropanol;

2.1%; 3.9%; 9.0%; 13.4% when the hydrolysis was carried out with hdyrochloric acid 12N diluted by adding an equal volume of methylethylketone.

EXAMPLE 12

A chlorination treatment was carried out under the same conditions as in Examples 10 and 11, replacing toluene by heptane on chrysotile fibers hydrolyzed at various hydrolysis rates. More particularly, chlorine rates of 2.1%, 2.4%, 6.9% were obtained for respective hydrolysis rates of 10%, 20% and 40%.

What is claimed is:

1. A process which comprises reacting a chlorinated mineral with at least one polymerizable monomer in the presence of a free radical initiator, said chlorinated mineral having a siliceous framework of a phyllosilicate in which 5–80% by weight of the octahedral layers are removed and chlorine atoms linked to the said framework through Si—Cl bonds.

2. A process according to claim 1, wherein said mineral comprises chrysotile fibers.

3. A process according to claim 1, wherein 10–40% of the octahedral layers are removed.

4. A process which comprises reacting a chlorinated mineral with at least one organic compound having:
   a. at least one function capable of reacting with the chlorine atoms of the chlorinated mineral so as to graft said organic compound onto said mineral; and
   b. at least one polymerizable double bond, said chlorinated mineral having the siliceous framework of a phyllosilicate in which 5–80% by weight of the octahedral layers are removed and chlorine atoms linked to the said framework through Si—Cl bonds.

5. A process according to claim 4, wherein said mineral comprises chrysotile fibers.

6. A process according to claim 4, in which the said organic compound is an alcohol or an organometallic compound.

7. A process according to claim 5, in which the said organic compound is an alcohol or an organometallic compound.

8. A process according to claim 4, in which the said organic compound is allyl alcohol.

9. A process according to claim 5, wherein the said organic compound is allyl alcohol.

10. A process according to claim 4, wherein 10–40% of said octahedral layers are removed.

11. A material which comprises a siliceous framework of a phyllosilicate in which 5–80% by weight of the octahedral layers are removed with chlorine atoms linked to the said framework through Si—Cl bonds, said material having organic radicals grafted upon the said siliceous framework, said organic radicals having at least one group enabling a later polymerization and grafted onto the framework by substitution of a part of the chlorine atoms.

12. A material according to claim 11, in which the mineral comprises chrysotile fibers.

13. A material according to claim 11, wherein said group enabling a later polymerization is an olefinic double bond.

14. A material according to claim 12, wherein said group enabling a later polymerization is an olefinic double bond.

15. A material according to claim 11, in which 10–40% of the octahedral layers are removed.

* * * * *